(12) United States Patent
Schön et al.

(10) Patent No.: US 12,160,195 B2
(45) Date of Patent: Dec. 3, 2024

(54) DRIVE MOTOR FOR A VACUUM CLEANER OR A MACHINE TOOL

(71) Applicant: Festool GmbH, Wendlingen (DE)

(72) Inventors: Patrick Schön, Wendlingen (DE); Markus With, Frickenhausen (DE)

(73) Assignee: FESTOOL GMBH, Wendlingen (DE)

( * ) Notice: Subject to any disclaimer, the term of this patent is extended or adjusted under 35 U.S.C. 154(b) by 188 days.

(21) Appl. No.: 17/910,029

(22) PCT Filed: Mar. 10, 2021

(86) PCT No.: PCT/EP2021/056020
§ 371 (c)(1),
(2) Date: Sep. 8, 2022

(87) PCT Pub. No.: WO2021/185650
PCT Pub. Date: Sep. 23, 2021

(65) Prior Publication Data
US 2023/0099477 A1    Mar. 30, 2023

(30) Foreign Application Priority Data
Mar. 18, 2020 (DE) ...................... 10 2020 107 466.2

(51) Int. Cl.
*H02K 7/14* (2006.01)
*H02K 7/08* (2006.01)
(Continued)

(52) U.S. Cl.
CPC ............... *H02P 6/16* (2013.01); *H02K 7/083* (2013.01); *H02K 7/145* (2013.01); *H02K 11/215* (2016.01);
(Continued)

(58) Field of Classification Search
CPC .......... H02P 6/16; H02P 2207/05; B25F 5/00; H02K 11/215; H02K 7/083; H02K 7/145; H02K 21/16
See application file for complete search history.

(56) References Cited

U.S. PATENT DOCUMENTS

| | | |
|---|---|---|
| 4,230,976 A | 10/1980 | Müller |
| 5,864,192 A | 1/1999 | Nagate et al. |

(Continued)

FOREIGN PATENT DOCUMENTS

| | | |
|---|---|---|
| DE | 2346380 B2 | 11/1975 |
| DE | 100 14 626 A1 | 10/2000 |

(Continued)

*Primary Examiner* — Karen Masih
(74) *Attorney, Agent, or Firm* — Hoffmann & Baron, LLP

(57) ABSTRACT

A drive motor (10) for a vacuum cleaner or a machine tool, wherein the drive motor (10) includes a stator (20) with a stator coil arrangement (26), and a rotor (30) wherein a sensor arrangement (60) is arranged in a stationary manner with respect to the stator in order to detect a respective angle of rotation position of the rotor (30) with respect to the stator, said sensor arrangement comprising at least two sensors (67A, 67b, 67C). It is provided that the at least two sensors are configured to detect two waves of a magnetic rotating field (FB) of the rotor (30) wherein the sensors generate the switching signals in a manner dependent on a wave of the magnetic rotating field (FB) exceeding or undershooting a switching threshold (SH, SL) of the sensor (67A, 67b, 67C).

20 Claims, 6 Drawing Sheets

(51) Int. Cl.
   *H02K 11/215*   (2016.01)
   *H02K 21/16*   (2006.01)
   *H02P 6/16*   (2016.01)
   *B25F 5/00*   (2006.01)

(52) U.S. Cl.
   CPC ............... *H02K 21/16* (2013.01); *B25F 5/00* (2013.01); *H02P 2207/05* (2013.01)

(56) References Cited

U.S. PATENT DOCUMENTS

| | | |
|---|---|---|
| 6,433,503 B1 | 8/2002 | Uematsu et al. |
| 2003/0089511 A1 | 5/2003 | Tsuneda et al. |
| 2009/0001912 A1 | 1/2009 | Miyajima et al. |
| 2010/0148711 A1 | 6/2010 | Tadano |
| 2011/0316459 A1 | 12/2011 | Kawamura et al. |
| 2017/0141708 A1 | 5/2017 | Kondoh |
| 2019/0140532 A1 | 5/2019 | Wang et al. |

FOREIGN PATENT DOCUMENTS

| | | | |
|---|---|---|---|
| DE | 102021206870 A1 | * | 1/2023 |
| JP | 63-262055 A | | 10/1988 |
| WO | 2011/159674 A1 | | 12/2011 |

\* cited by examiner

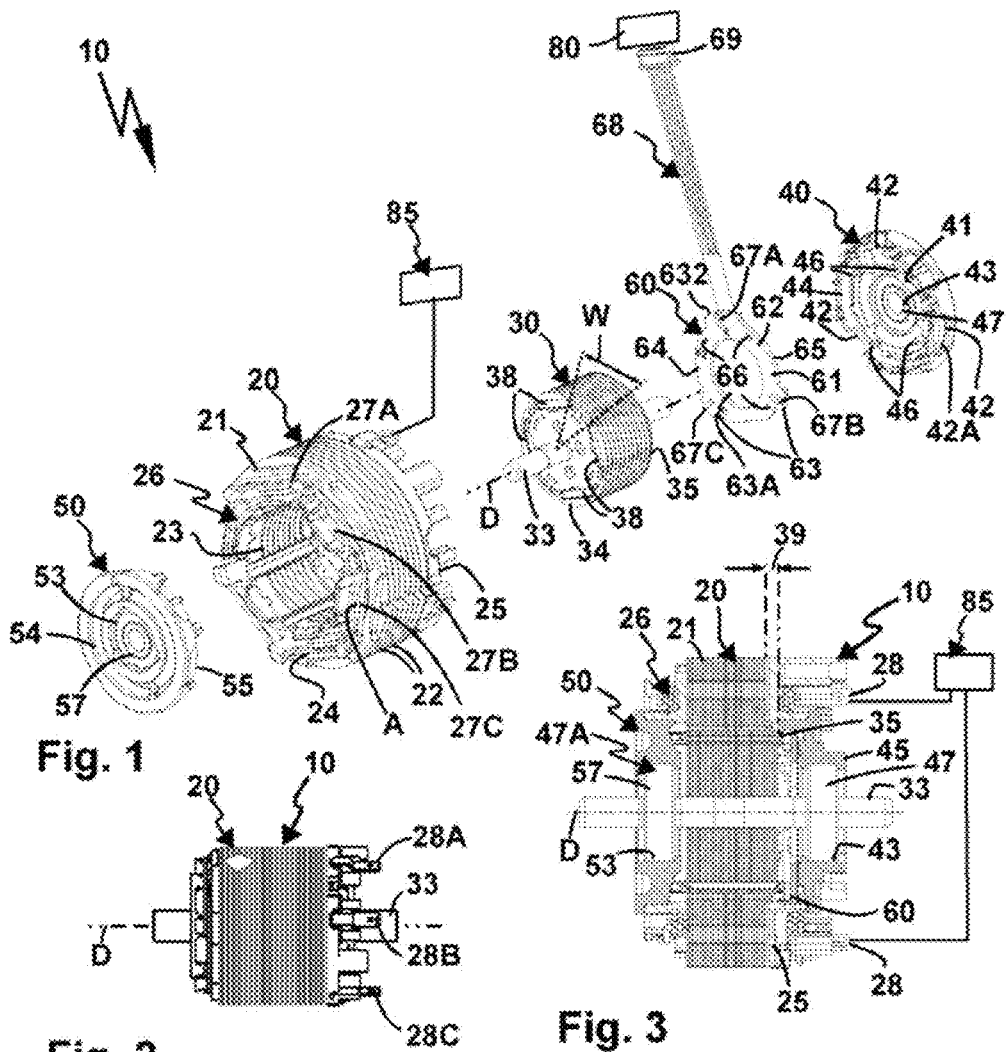
Fig. 1
Fig. 2
Fig. 3
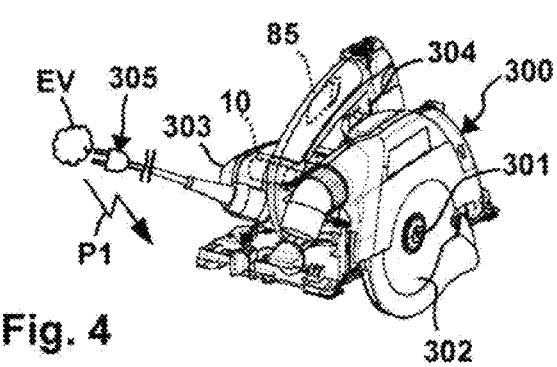
Fig. 4
Fig. 5

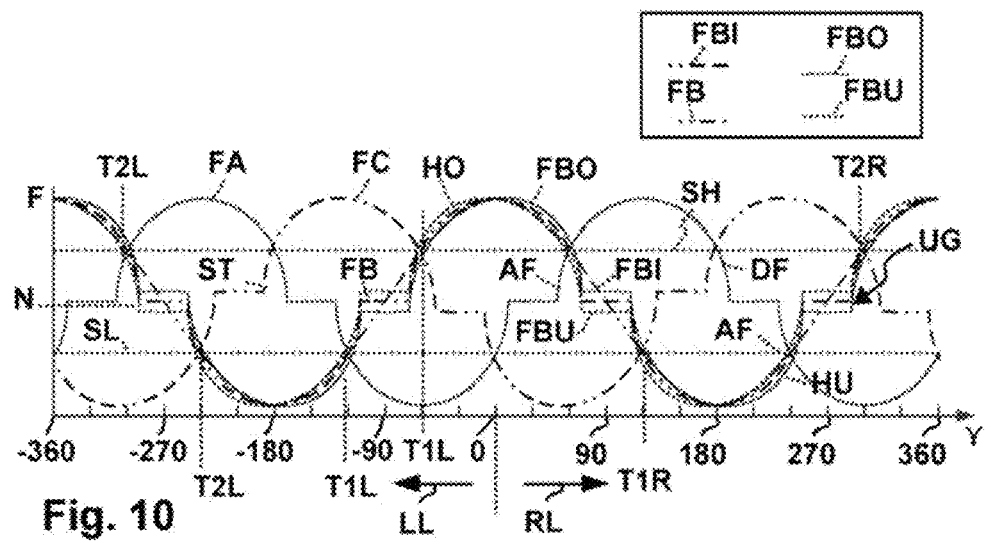
Fig. 10
Fig. 11
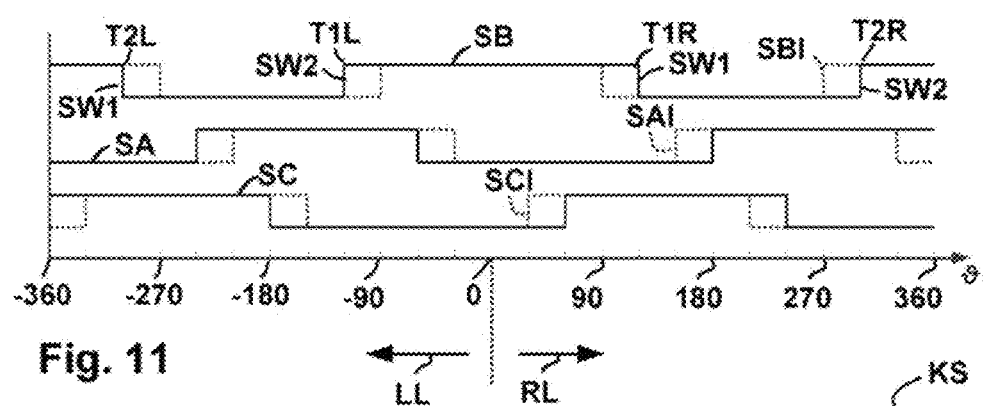
Fig. 12
Fig. 13

DRIVE MOTOR FOR A VACUUM CLEANER OR A MACHINE TOOL

This application is a National Stage application based on International Application No. PCT/EP2021/056020, filed Mar. 10, 2021, which claims priority to DE 102020107466.2, filed Mar. 18, 2020.

BACKGROUND OF THE INVENTION

The invention relates to a drive motor for a vacuum cleaner or a machine tool in the form of a hand-held machine tool or a semi-stationary machine tool, wherein the drive motor comprises a stator with a stator coil arrangement, and a rotor with a motor shaft which is mounted on the stator or with respect to the stator using a bearing arrangement so as to be able to rotate about an axis of rotation, wherein the rotor comprises a magnet arrangement with permanent magnets arranged annularly about the axis of rotation, wherein a sensor arrangement is arranged in a stationary manner with respect to the stator in order to detect a respective angle of rotation position of the rotor with respect to the stator, said sensor arrangement comprising at least two sensors which are configured to generate, in particular, digital switching signals for an energization device for energizing the stator coil arrangement so that the rotor can be driven in rotation about the axis of rotation through energization of the stator coil arrangement.

Such a drive motor is, for example, a so-called electronically commutated motor or EC motor. For the energization of the stator coil arrangement of the motor, an energization device is provided. In order to enable a correct energization of the stator coil arrangement, that is to say in particular to energize the stator coils at appropriate switching times, the energization device requires information on the respective rotation angle position of the rotor, for the purpose of which the sensor arrangement is provided. However, during the operation of such a drive motor, disturbing effects occur, to the effect that, for example, due to overlapping of the magnetic fields of the permanent magnets and of the magnetic fields generated by the stator coil arrangement, the typically available switching signals of the sensor arrangement are not optimal.

SUMMARY OF THE INVENTION

Therefore, the aim of the present invention is to provide an improved drive motor, in particular an improved electronically commutated drive motor.

For achieving the aim, in a drive motor of the type mentioned at the start, it is provided that the at least two sensors are configured to detect two waves of a magnetic rotating field of the rotor, said waves being phase-shifted about an angle of rotation, wherein the sensors generate the switching signals in a manner dependent on a magnetic wave of the rotating field exceeding or undershooting a switching threshold of the sensor, said wave respectively passing through the sensor, and that the permanent magnets of the magnet arrangement with respect to the axis of rotation comprise angular spacings from one another, so that the magnetic waves of the rotating field comprise at the location of the respective sensor continuous, in particular approximately sinusoidal, half-waves with vertices between continuously rising and falling edges, wherein the waves comprise transition sections between respective successive half-waves of different polarity, wherein the waves in the transition sections comprise at least one step or a jump or an unevenness, and the switching thresholds of the sensors are arranged in the region of the continuously rising or falling edges of the half-waves.

Furthermore, the invention provides a machine tool, in particular a hand-held machine tool or a semi-stationary machine tool, with a drive motor according to the invention. The machine tool is, for example, a machine saw, a power drill, a power screwdriver or the like. Semi-stationary machines are understood to be, for example, a mobile machine which can be transported to an application site, for example, to a construction site, in particular a circular table saw or the like.

Here, a basic idea is that the sensor arrangement is precisely not located in the region of transition sections where steps, jumps or other similar unevenness are observed, but that the switching thresholds are located outside of the transition sections.

The drive motor according to the invention is, for example, a brushless DC motor also abbreviated as BLDC or BL motor (BL=brushless, DC=direct current). The drive motor can also be a BLAC motor (BL=brushless, AC=alternating current). The drive motor can also be an electronically commutated motor (EC motor), a permanent magnet synchronous motor (PMSM) or the like.

A respective hysteresis of a sensor for the purpose of the invention is preferably set so that the switching thresholds of the sensors are located in the region of the continuously rising or falling edges of the half-waves.

Advantageously, the sensor arrangement comprises magnetic sensors or magnetic field sensors configured to output digital switching signals, for example, Hall sensors, magnetoresistive sensors (MR sensors), in particular anisotropic MR sensors or AMR sensors, GMR sensors, magneto-optical sensors or the like.

It is possible that, for example, an evaluation device of the sensor arrangement generates a digital switching signal from an analog measurement signal of a sensor, in that the evaluation device compares the analog measurement signal with the respective switching threshold. However, the sensors preferably already output digital switching signals. Correspondingly, it is advantageous if the switching thresholds are provided and/or set in the sensors or on the sensors. The switching thresholds in the sensors or on the sensors can also be, for example, preset and/or predetermined by production accuracies or production conditions.

In fact, in principle it would indeed be possible for a magnet configured, so to speak, as switching magnet or sensor magnet so to speak to be present on the rotor, said magnet not being provided to cooperate with the stator coil arrangement for the purpose of driving in rotation of the rotor. However, it is preferable for the rotor to comprise only such magnets which are provided for driving in rotation of the rotor or for actuation of its rotation. The permanent magnets of the magnet arrangement are thus preferably used for driving in rotation of the rotor in cooperation with the stator coil arrangement or they are configured and provided for this purpose. The permanent magnets which in any case are already necessary for the driving in rotation of the rotor and thus of the drive motor are thus used for an additional purpose, namely for actuating the sensors or the sensor arrangement.

However, it should be mentioned here that it is possible to provide without problem at least one additional magnet or magnetic encoder or magnetic switch in addition to the permanent magnets provided for the driving in rotation of the motor, the magnetic field of which is swept by at least one sensor of the sensor arrangement.

However, it is preferable if the magnetic encoder or magnet is provided on the rotor exclusively for the actuation of the sensor arrangement and not for the driving in rotation of the rotor. On the rotor, preferably exclusively, the permanent magnets of the magnet arrangement provided for the driving in rotation of the rotor are arranged as permanent magnetic components or permanent magnets.

Between the permanent magnets of the magnet arrangement, in particular between mutually facing sides of adjacent permanent magnets, angular spacings and/or gaps and/or interstices with respect to the axis of rotation are preferably present. The angular spacings with respect to the axis of rotation are, for example, at least 5°, preferably at least 10°, in particular at least 15° with respect to the axis of rotation. Therefore, quasi gaps are present between the permanent magnets, which in itself negatively influences the quality of the rotating field acting on the sensor arrangement. However, due to the switching thresholds of the sensors it is possible to so to speak eliminate or mask unevenness, steps or jumps of magnetic rotating field.

The permanent magnets are preferably sheets, sheet-shaped or configured in the manner of disks.

It is advantageous if the permanent magnets and/or the rotor as a whole protrudes in the direction of the sensor arrangement in front of the stator or a front side of the stator. Thereby, the magnetic field of the permanent magnets can be better detected by the sensors.

Between the magnet arrangement and the sensor arrangement, that it so say, for example, between mutually facing sides of the rotor permanent magnets and of the sensors, minimum spacings are advantageous, for example, a minimum spacing of at least 0.4 mm, preferably at least 0.8 mm, in particular at least 1 mm. The nominal minimum spacing between magnet arrangement and sensor arrangement is, for example, 1 mm, wherein, due to tolerances, spacings between 0.4 mm and 1.6 mm are possible.

It is indeed possible that the sensors of the sensor arrangement are or will be stationarily arranged individually or singly on the stator or with respect to the stator. However, it is preferable if the sensors of the sensor arrangement are arranged on a sensor support, for example, on a circuit board. The sensor support preferably comprises positive locking contours for positive locking fastening on the stator, for example, positive locking projections, positive locking recesses or the like, and/or it is fastened in a non-positive locking manner on the stator, for example, using a clamping device.

It is in particular advantageous if the sensor support is configured to be mounted on a motor cover or between a motor cover and a stator sheet stack of the stator. The motor cover is, for example, a so-called engine plate. On the motor cover, for example, a recess for the sensor support can be provided, in particular a receiving depression. The motor cover comprises, for example, a pivot bearing of the bearing arrangement for the motor shaft or a bearing recess for a pivot bearing of the bearing arrangement. The motor cover can also form the sensor support, i.e., the sensors are arranged or the sensor arrangement is arranged on the motor cover.

Advantageously, it is provided moreover that the sensor support comprises at least one positive locking contour for mounting on the stator or with respect to the stator, in such a manner that the sensor support on the stator or with respect to the stator can be mounted in only one angular position with respect to the axis of rotation of the drive motor or only in such angular positions in which, between each sensor of the sensor arrangement and a coil of the stator coils which is arranged next to the sensor, a predetermined angular spacing is provided. Thus, it is certainly possible for multiple angular positions to be provided, in which the sensor support or the sensor arrangement can be arranged with respect to the axis of rotation on the stator. However, these angular positions advantageously are predetermined angular positions, in which, between the sensors of the sensor arrangement and the stator coils, predetermined angular spacings with respect to the axis of rotation are provided. Advantageously, the angular spacing is zero.

A positive locking counter-contour for engagement of the positive locking contour of the sensor support can be arranged on the stator and/or on a motor cover. The motor cover can preferably be fastened in a single angle of rotation position or in predetermined angle of rotation positions on the stator, so that the sensor support held on the motor cover in a predetermined angular position can be mounted in a predetermined angular position with respect to the stator. Multiple positive locking contours and positive locking counter-contours are preferable, which, with respect to the axis of rotation of the drive motor, comprise angular spacings with respect to one another, in particular equidistant angular spacings.

It is advantageous if at least one sensor, preferably each sensor of the sensor arrangement, is arranged in each case centrally with respect to the stator coil associated with the sensor. However, it is advantageously also possible that at least one sensor, preferably each sensor of the sensor arrangement, is arranged so to speak in a tooth center and/or is arranged centrally between adjacent stator coils.

The switching thresholds can be directly provided in the respective sensors so that they in each case change the digital value of their sensor signal or switching signal when a switching threshold is exceeded and/or undershot. However, it is also possible for the evaluation device to digitally change the value of the sensor signal or switching signal when the switching threshold is exceeded and/or undershot.

An optimal configuration in practice provides switching thresholds of the following type:

A respective half-wave of the magnetic rotating field passes through a phase angle range of 180°, a full-wave of the magnetic rotating field correspondingly passes through a phase angle range of 360°. A full-wave contains two successive half-waves, namely a positive half-wave and negative half-wave, or half-waves with mutually opposite polarities, for example, a first polarity and a second polarity. Between a negative half-wave and a positive half-wave or between the half-waves with different polarities there is a zero-crossing so to speak.

In a rotor with a number of pole pairs of 1, that is to say with two magnetic poles, a full-wave of the magnetic rotating field occurs on a respective sensor during one mechanical rotation of the rotor, and in a rotor with a number of pole pairs of two, a full-wave occurs twice for example. To the extent that the waves of the magnetic rotating field are described below, they are described with electrical angles.

The switching thresholds of the sensors or for the sensors are advantageously selected so that the switching signal of a respective sensor at an electrical phase angle of approximately 30° or exactly 30° after a transition of a wave of the magnetic rotating field from a positive half-wave to a negative half-wave or from a negative half-wave to a positive half-wave comprises a switching signal change. In other words, it can also be provided that the switching thresholds of the sensors or for the sensors are provided so that the switching signal of a respective sensor at a phase angle of approximately 30° after a transition of a wave of the magnetic rotating field from a half-wave with the first polarity to a half-wave with the second polarity comprises a switching signal change.

A switching signal change or a change of the switching signal here is, for example, a change from logic zero to logic one or vice versa. Certain tolerances with respect to the angle of 30° are possible. However, an exact setting of the switching thresholds is preferable for the most exact possible signal change at the phase angles of 30° after a transition of the wave of the magnetic rotating field from a first polarity to a second polarity.

By means of the above-mentioned switching thresholds, the drive motor can be operated without problem in mutually opposite directions of rotation.

Moreover, due to the selection of the switching thresholds at exactly or approximately 30°, it is possible that, with mechanically identical design of the drive motor but different wiring of the stator coil arrangement in a delta connection or in a star connection, the sensor arrangement can be operated without mechanical or electrical modification. Furthermore, the selection of the switching threshold at exactly or approximately 30° also allows different winding arrangements and/or different wirings of the stator coil arrangement.

Advantageously, for setting the phase angle and/or for setting the switching thresholds, a magnetic hysteresis of a respective sensor, for example, a Hall sensor, is used. Preferably, it is provided that the phase angle of approximately 30° and/or the switching thresholds is/are set using a magnetic hysteresis of a respective sensor.

The energization device preferably forms a component of the drive motor. The drive motor and the energization device can also form a system. In particular, the machine tool of the type mentioned at the start, for example, a hand-held machine tool or a semi-stationary machine tool, comprises the drive motor as well as an energization device.

The stator coil arrangement can be connected for example, in a delta connection or a star connection and/or it can be connected to the energization device.

The energization device is preferably configured for block energization of the stator coil arrangement. The energization device preferably comprises a bridge connection for the energization of the stator coil arrangement.

Preferably the energization device comprises a commutation table for a delta connection of the stator coil arrangement and a commutation table for a star connection of the stator coil arrangement. The commutation tables can be stored, for example, in a storage of the energization device. A program module of the energization device can be parametrizable for access to the respective commutation table suitable for the star connection or the delta connection.

In the case of a power supply of the drive motor via a mobile energy storage, for example, via a battery pack or rechargeable battery pack, it is preferable for the delta connection to occur. Particularly preferable is a machine tool with a drive motor according to the invention, the stator coil arrangement of which comprises a delta connection and is connected to an energization device supplied with current via an electrical energy storage. The machine tool thus comprises, for example, a supply connection for detachable arrangement of the electrical energy storage. The energy storage provides, for example, as supply voltage for the energization device and thus the drive motor, a DC voltage of 10.8 V, 12 V, 14 V, 18 V, 36 V or the like. Therefore, the energy storage advantageously provides high currents at comparatively low supply voltage. The machine tool advantageously is a power screwdriver or a screwing device.

The star connection is preferable in the case of a current supply of the drive motor via an AC electrical voltage network with, for example, 120 V, 230 V or the like. The AC voltage network supplies relatively speaking a relatively high supply voltage, so that the energization device draws smaller currents from the AC voltage network. The drive motor with a stator coil arrangement which is connected in a star connection and to an energization device, is advantageously a component of a machine tool with a supply connection for an AC electrical voltage network. For example, the machine tool has a connection cable for connection to the AC voltage network and/or a plug connection for connection of a connection cable for the AC voltage network.

Using the switching signals of the sensor arrangement, the energization device can actuate the stator coil arrangement for the purpose of a neutral commutation, but in principle also for the purpose of a precommutation or postcommutation.

A neutral commutation provides that the voltages of the stator coils are set in such a manner that the magnetic rotating field generated by the stator coils is synchronous or coincides with the rotor position or the angle of rotation position of the rotor.

A precommutation provides that the voltages of the stator coils are set in such a manner that the magnetic rotating field runs ahead of or precedes the rotor position or the angle of rotation position of the rotor.

A postcommutation correspondingly provides that the voltages of the stator coils are set in such a manner that the magnetic rotating field generated by the stator coils trails the rotor position or the angle of rotation position of the rotor.

A preferred concept provides that the sensor arrangement generates the switching signals in a delta connection of the stator coil arrangement for the purpose of a neutral commutation. Advantageously, it is provided that the sensor arrangement is arranged with respect to the stator such a way that the sensors generate the switching signals in a delta connection of the stator coil arrangement for the purpose of a neutral commutation. In particular, in the case of a current supply of the drive motor or of the machine tool via an energy storage, this design which preferably provides a DC voltage in a range from 12 to 48 V is advantageous. This design is advantageous particularly in the case of a use of the drive motor in a machine tool for which a high startup torque is desired, for example, in a design of the machine tool as power screwdriver.

The neutral commutation is brought about in particular in that the switching thresholds of the sensors are set up so that, at a phase angle of approximately 30° before and after a zero-crossing of a wave of the magnetic rotating field, the sensors output a switching signal change.

Furthermore, it is possible that the sensor arrangement generates the switching signals in a star connection of the stator coil arrangement for the purpose of a precommutation. It is advantageous that the sensor arrangement is arranged with respect to the stator in such a manner that the sensors generate the switching signals in a star connection of the stator coil arrangement for the purpose of a precommutation. In particular, this design is advantageous in a machine tool which is provided for the electrical current supply via an AC electrical voltage network and comprises a supply connection suitable for this purpose. For example, this machine tool is a machine saw, in which a low startup torque of the drive motor is acceptable, since initially the work tool, for example, the saw blade, is brought to a predetermined rotational speed, before the work tool engages or cuts into the workpiece. The precommutation preferably corresponds electrically to approximately 30°.

However, it is also possible that the sensor arrangement is arranged with respect to the stator in such a manner that the sensors generate the switching signals in a star connection of the stator coil arrangement for the purpose of a neutral commutation, whereas in a delta connection, the switching signals are generated for the purpose of a postcommutation or precommutation.

It is possible that the waves measured by the sensors are only those waves generated by the permanent magnets. However, in practice, there are overlap effects due to the magnetic rotating field generated by the stator coil arrangement. The magnetic rotating field measured by the sensors or acting on the sensors contains, for example, a magnetic subfield which is generated by the stator coil arrangement and a magnetic subfield generated by the permanent magnets, wherein the subfields overlap one another.

The rotor and/or the stator preferably comprise(s) sheet stacks. The sheet stacks of the rotor and/or of the stator are preferably produced from layered electrical sheets or transformer sheets.

The motor shaft passes, for example, through a shaft passage opening of a sheet stack retained on the motor shaft.

Below, an embodiment example of the invention is explained based on the drawing. Even if the embodiment example represents a two-pole rotor, this does not mean a limitation of the application of the invention. The principle can also be implemented without problem in the case of rotors having additional poles, for example, four-pole or six-pole rotors, or rotors with another magnet arrangement. The stator coil arrangement can also be modified. Likewise, the stator coil arrangement of the following embodiment example can also be wired or interconnected in another manner than in a delta connection or a star connection, for example using combinations of star connection and delta connection, series connections or parallel connections or the like.

BRIEF DESCRIPTION OF THE DRAWINGS

The figures show:

FIG. 1 an exploded representation of a drive motor which is

FIG. 2 represented from the side,

FIG. 3 in a longitudinal section through the drive motor according to preceding figures, FIG. 4 a hand-held machine tool with a drive motor according to preceding figures in the form of a corded machine, FIG. 5 a hand-held machine tool in the form of a hand-held machine tool operated with a mobile energy storage, as well as a drive motor according to FIGS. 1-3, FIG. 6 an exploded representation of a rotor as well as of a sensor arrangement of the drive motor according to preceding figures, FIG. 7 a detail of the rotor as well as of permanent magnets on the rotor, approximately corresponding to a section D1 in FIG. 6, FIG. 8 a circuit diagram of the drive motor as well as of an energization device, FIG. 9 a diagrammatic front view of the drive motor as well as of the sensor arrangement, FIG. 10 a curve of magnetic fields that can be measured by the sensor arrangement of the drive motor according to FIG. 9, FIG. 11 a diagrammatic representation of switching signals of the sensor arrangement of the drive motor according to preceding figures, FIG. 12 a commutation table for a stator coil arrangement of the drive motor according to preceding figures, which is connected in a star connection to the energization device, FIG. 13 a commutation table for a stator coil arrangement of the drive motor according to preceding figures, which is in a delta connection with the energization device, FIG. 14 phase voltages of the stator coil arrangement in a star connection, which correspond to a counter-EMF (EMF=electromotive force), FIG. 15 block voltage curves set by the energization device of the drive motor on the stator coil arrangement in a star connection according to FIG. 14, synoptically with ideal voltage curves, and FIG. 16 curves of the counter-EMF of the stator coil arrangement in a delta connection and an individual exemplary block voltage curve.

DETAILED DESCRIPTION

Figure 6:
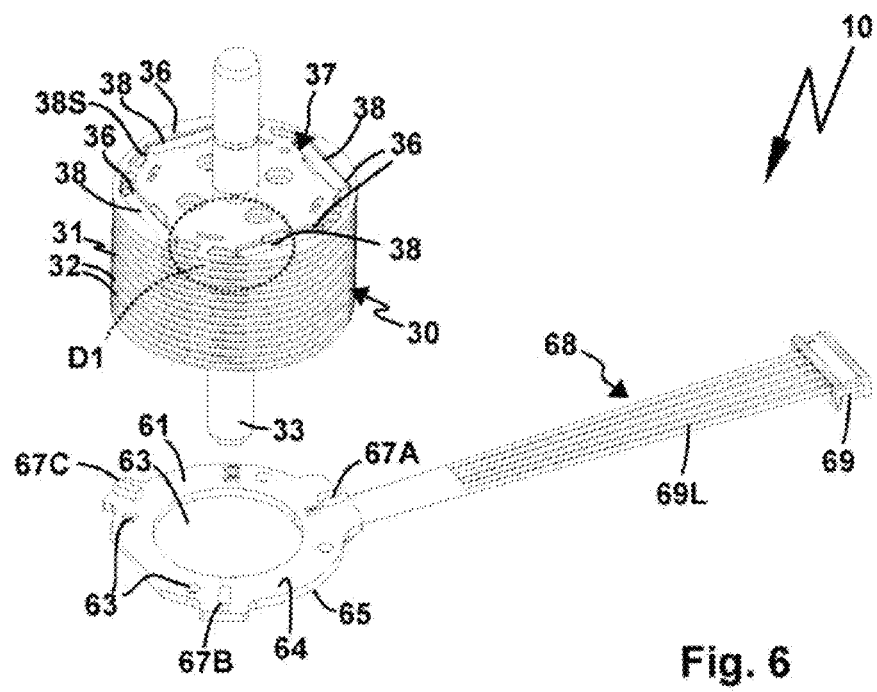
Figure 7:
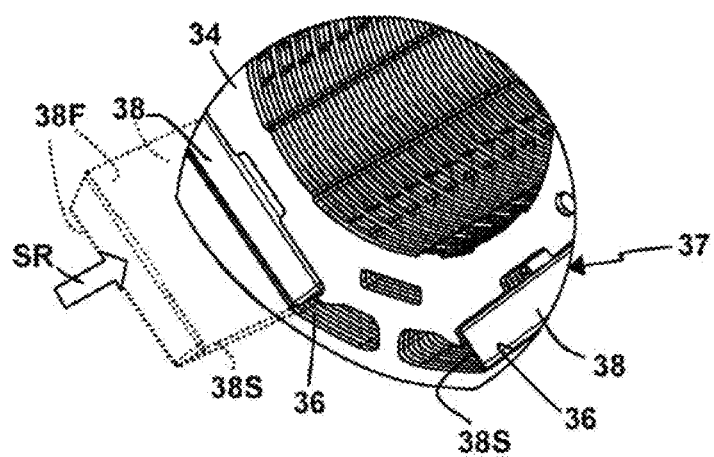
Figure 8:
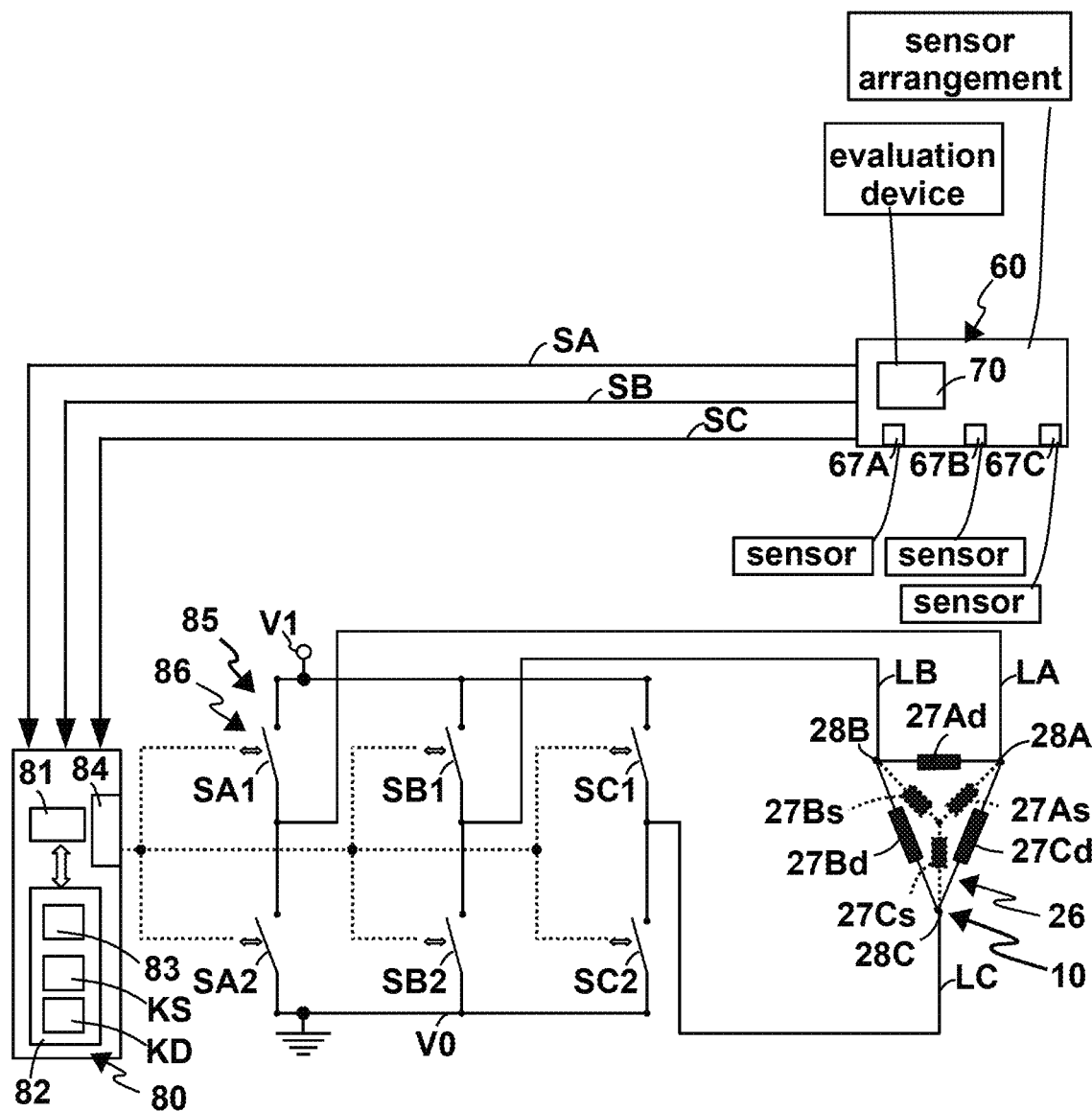

A drive motor 10 comprises a stator 20 on which a rotor 30 is mounted so as to be able to rotate about an axis of rotation D. The stator 20 comprises a stator sheet stack 21 with sheets 22. The sheet stack 21 has a recess 23 in which the rotor 30 is accommodated. On mutually opposite end faces 24 and 25, motor covers 50 and 40 which close the recess 23 are arranged.

Moreover, the stator 20 supports a stator coil arrangement 26 with stator coils 27A, 27B and 27C.

The rotor 30 comprises a rotor sheet stack 31 which is accommodated in the recess 23. The sheet stack 31 comprises sheets 32 which are stacked on top of one another. The sheet stack 31 is penetrated by a motor shaft 33 which is mounted using a bearing arrangement 47A with respect to the stator 20 so as to be able to rotate about the axis of rotation D. End faces 34 and 35 of the rotor 30 face the motor covers 50 and 40.

On the rotor sheet stack 31, magnet recesses 36 for permanent magnets 38 of a magnet arrangement 37 are provided. The permanent magnets 38 are inserted into the magnet recesses 36, for example, by plug-in mounting with a force direction SR.

The permanent magnets 38 are configured in the form of sheets and comprise, for example, flat sides 38F, between which small sides 38S extend. The permanent magnets 38 are arranged next to one another by the small sides 38S, so that an annular configuration is formed.

However, between the permanent magnets 38, angular spacings W are present. There is no permanent magnet in the angular spacings W.

The flat sides 38F extend, for example, orthogonally with respect to radius lines extending away from the axis of rotation D.

The motor covers 40, 50 comprise bearing recesses 43, 53 in which pivot bearings 47, 57 of the bearing arrangement 47A are accommodated and which rotatably mount the motor shaft 33. The pivot bearings 47, 57 are, for example, rolling bearings, in particular ball bearings. The motor shaft 33 protrudes, for example, on one side or two sides in front of the stator 30 or the motor covers 40, 50; in the embodiment example it even protrudes on two sides, namely on end faces or front sides 45, 54 of the motor cover 40, 50. End faces 44 and 55 of the motor covers 40 and 50 face the stator 20 and close said stator off on the end face.

The stator coil arrangement 26 is connected to an energization device 85 using connections 28A, 28B, 28C which are connected to the stator coils 27A, 27B, 27C.

The energization device 85 energizes the stator coils 27 in such a manner that a rotating field forms, which in alternating action with the magnet arrangement 37 drives the rotor 30 in rotation about the axis of rotation D.

The energization device 85 comprises, for example, a control 80 by means of which a bridge connection 86 can be actuated. The bridge connection 86 includes upper switches SA1, SB1, SC1 and lower switches SA2, SB2, SC2, wherein the upper switches SA1, SB1, SC1 are connected to a supply potential V1 and the lower switches SA2, SB2, SC2 are connected to a potential V0, for example, ground. Between the respective upper and lower switches SA1, SA2 or SB1, SB2, or SC1 and SC2 a respective connection line LA, LB and LC is connected, which is connected to the connections 28A-28C.

In order to optimally actuate the stator coils 27, the control 80 requires information on the respective rotation position of the rotor 30 with respect to the stator 20 with respect to the axis of rotation D. For this purpose, a sensor arrangement 60 is provided. The sensor arrangement 60 includes a sensor support 61, for example, a circuit board 62 which is stationary with respect to the stator 20. For example, the sensor support 61 is retained sandwiched on the motor cover 40 and/or between the motor cover 40 and the stator 20.

The sensor support 61 is accommodated in a recess 41 of the motor cover 40. Said motor cover comprises on its radial outer circumference positive locking recesses 42, that is to say positive locking counter-contours 42A, in which the positive locking projections 63, that is to say positive locking contours 63A, of the sensor support 61, engage. The positive locking projections are, for example, configured as star-like, so that they go in a positive locking manner into the positive locking recesses 42 which are complementary thereto. Thereby, the sensor support 61 is retained in the recess 41 in a rotationally fixed manner with respect to the axis of rotation D.

Additional positive locking contours, namely, for example, positive locking recesses 66 in the form of plug-in recesses, in which the positive locking projections 46 protruding from the motor cover 40 in the direction of the recess 41, that is to say positive locking counter-contours, engage, ensure an additional rotationally fixed retention. The positive locking projections 63 and positive locking recesses 66 are angularly spaced with respect to the axis of rotation D, as are the positive locking recesses 42 and positive locking projections 46 of the motor cover 40, which are complementary thereto and retain these positive locking parts.

The end face 35 of the rotor 30 protrudes in front of the end face 25 of the stator 20 by predetermined amount 39, so that the magnetic field and thus the magnetic field of the permanent magnets 38 can better pass through the sensors 67A, 67B and 67C of the sensor arrangement 60.

The sensors 67A, 67B and 67C are advantageously arranged on the end face 64 of the sensor support 61 facing the rotor 30. There, other electrical components, for example, resistors and the like can also be arranged. The sensors 67 are, for example, Hall sensors which comprise preset or settable switching thresholds. However, it is also possible for the sensors 67 to be sensors which generate analog measurement signals in a manner corresponding to the magnetic field acting on them, measurement signals which are then evaluated by an evaluation device 70, for example, by a threshold logic, of the sensor arrangement 60.

The sensor arrangement 60 comprises a connection device 68 for connection to the control 80. The connection device 68 includes, for example, a plug 69 which is connected via lines 69L to the sensor support 61 and to the electric components arranged thereon, for example, to the sensors 67. The lines 69L correspondingly enable the transmission of switching signals SA, SB and SC of the sensors 67A, 67B, 67C or of the evaluation device 70. As mentioned, it is possible that the sensors 67A, 67B, 67C already generate digital switching signals. However, it is also possible that the evaluation device 70 can generate the digital switching signals SA, SB and SC using analog measurement signals or sensor signals of the sensors 67A, 67B, 67C. But in principle, it is also conceivable that the sensors 67A, 67B, 67C transmit analog measurement signals to the control 80 which generates digital switching signals 67A, 67B, 67C therefrom. The control 80 thus forms so to speak an evaluation device of the sensor arrangement 60 or a component of the sensor arrangement 60.

The control 80 includes a processor 81 which communicates with a storage 82 in which a control program 83 for actuating the energization device 85 is stored. The energization device 85, in particular the bridge connection 86, represents power electronics which can be actuated by the control 80 via an interface 84. The switches SA1-SC2 are, for example, power transistors, etc. This is known per se.

The stator coil arrangement 26 can be connected, for example, in a delta connection to the energization device 85. The stator coils 27 are designated by 27Ad, 27Bd and 27Cd. In the star connection represented in a dashed-line representation, on the other hand, the stator coils 27 are designated by 27As, 27Bs and 27Cs.

The delta connection is advantageous, for example, for a hand-held machine tool 80 which can be supplied with an electrical supply voltage P2 by an electrical energy storage 206, for example, for a rechargeable battery pack.

The star connection, on the other hand, is suitable, for example, for a machine tool 300, for example, a circular saw which can be supplied with a supply voltage P1 by an electrical energy supply network EV.

The hand-held machine tools 200, 300 comprise housings 203, 303 in which a respective drive motor 10 for driving a tool mount 201, 301 is arranged. The tool mount 201, 301 is used for detachably fastening a work tool 202, 302, for example, a drilling tool or a screw and nut assembly tool 202, or a sawing tool 302.

Using a switch 204 or 304, energization devices 85 of the hand-held machine tools 200 and 300 can be activated, in order to switch the drive motor 10 on or off and/or in order to change its rotational speed and/or its power.

The hand-held machine tool 200, for example, a screw screwing device or drilling device, comprises a supply connection 205 for the energy storage 206, for example, with plug contacts, a plug interface or the like.

The hand-held machine tool 300, on the other hand, comprises a supply connection 305, for example, a power cord with power plug for plugging into a connection device which is connected to the supply network EV.

Figure 9:
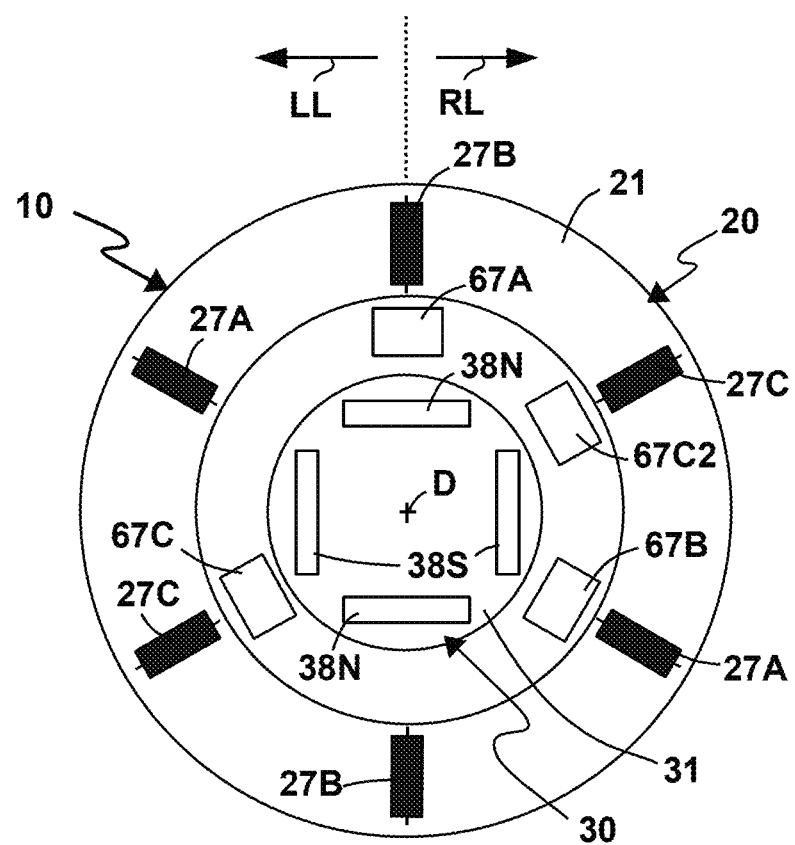

In FIG. 9, the drive motor 10 is represented diagrammatically. One sees that a respective sensor 27A, 27B and 27C is associated with the stator coils 27A, 27B and 27C in the center of the pole so to speak.

The stator coil arrangement 26 is wired in a multi-phase manner, for example, in a three-phase manner.

The rotor 30 is, for example, a two-pole rotor, wherein respective mutually facing permanent magnets 38 have the same polarity radially outward with respect to the axis of rotation D, that is to say in the direction of an air gap between rotor 30 and stator 20, while permanent magnets 38 which are angularly offset by 90 degrees with respect to the axis of rotation D have a polarity opposite thereto, which is indicated by the reference numerals 38S (for example, magnetic south pole) and 38N (for example, magnetic north pole) in the permanent magnets 38 in FIG. 9.

In FIG. 10, magnetic field curves are represented, namely an ideal field curve FBI which proceeds quasi sinusoidally from a zero position (phase angle γ=0). Proceeding from this zero position, a clockwise rotation RL and a counterclockwise rotation LL of the drive motor 10 and respectively the temporal curve of waves of the magnetic rotating field resulting therefrom are represented. The rotating field is represented in the case of a stationary observer located on the stator 20, in this case on the respective sensor 67, after a rotation of γ=X° and with respect to the number of the pole pairs of the rotor 30.

The ideal field curve FBI in so-called ideal rotor 30 is given, wherein the permanent magnets 38 are arranged directly next to one another, that is to say they have no angular spacings and/or there is no influence due to the rotating field proceeding from the stator coil arrangement 26. In the case of ideal waves, for example in the manner of the wave FBI, of the magnetic rotating field, the sensors 67A, 67B and 67C switch quasi ideal switching signals SAI, SBI and SCI in each case at the zero-crossing of the ideal waves of the magnetic rotating field, thus at a switching threshold N or a zero-crossing N according to FIG. 10.

However, magnetic sensors, for example, Hall sensors, have a so-called hysteresis. Said hysteresis is optimally set and used, as will become clearer below, in that, in the sensors 67 or in the evaluation device 70, an upper switching threshold SH and a lower switching threshold SL are set. The upper and lower switching thresholds SH and SL are symmetrical.

In contrast, due to the angular spacings between the permanent magnets 38, an actual curve of the waves of the magnetic rotating field which is detected by the sensors 67 results, for example, actual curves of the rotating fields FA, FB and FC which are detected by the sensors 67A, 67B, 67C or act thereon.

However, in addition there are influences due to the energizing of the stator coils 27A-27C or of the field generated thereby, so that the waves of the magnetic rotating field which is detected by the sensors 67A, 67B, 67C can also have maximum or minimum curves. For example, maximum and minimum curves FBO and FBU of the magnetic rotating field which acts on the sensor 67B are possible.

Between continuously rising edges AF or continuously falling edges DF of upper and lower half-waves HO and HU of the rotating field FA, FB, FC, there are transition sections UG with steps ST, in which the waves of the magnetic rotating field FB are not continuous. This so to speak neutral region so to speak or the transition sections UG are masked by upper and lower switching thresholds SH and SL of the sensors 67A, 67B, 67C. The upper switching threshold SH and the lower switching threshold SL are selected and/or designed accordingly.

Using the example of the sensor 67B, this should become clearer below:

During a clockwise rotation RL of the rotor 30, proceeding from the phase angle γ=0°, the magnetic rotating field which acts on the sensor 67B and/or is detected by said sensor at first comprises a positive or upper half-wave HO and, at the switching threshold N or at the zero-crossing N, it changes its polarity and becomes a lower half-wave HU. At a time T1R, the lower half-wave HU passes through the lower switching threshold SL, which leads to a switching of the sensor 67B, that is to say to a switching signal change SW1, for example, a change from logic one to logic zero.

After the rotating field FB, at a phase angle γ=180°, has passed through its lower maximum, so to speak, the lower half-wave HU transitions, at a phase angle of γ=270°, into an upper half-wave HO and exceeds at a time T2R the upper switching threshold SH, so that the sensor 67B is again switched so to speak and generates a switching signal change SW2, for example, from logic zero to logic one.

During the counterclockwise rotation LL of the rotor 30, this scheme works likewise: again, proceeding from the positive or upper half-wave HO, at a phase angle γ=0°, the rotating field FB transitions into the negative half-wave HU and undershoots at a time T1L the lower switching threshold SL, so that the sensor 67B changes the level of the switching signal SB from logic one to logic zero, that is to say it performs a switching signal change SW2.

During the further counterclockwise rotation LL of the rotor 30, the rotating field FB first passes through a minimum and then rises again and passes through the switching threshold N or the zero-crossing N and subsequently, at a phase angle of γ=−300°, the upper switching threshold SH, which leads to a switching signal change SW1 at a time T2L.

Represented in FIG. 12 is an exemplary commutation table KS for energizing the stator coil arrangement 26 in a star connection. Represented in FIG. 13 is an exemplary commutation table KD for energizing in a delta connection. The commutation tables KS and KD are, for example, stored in the storage 82 of the control 80 and can be used as desired by the program 83 in order to actuate the bridge connection 86, wherein the program 83 uses the commutation table KS for the stator coil arrangement 26 in a star connection and the commutation table KD for the stator coil arrangement 26 in a delta connection.

In the two commutation tables KS and KD, sectors S with values 1 to 6 are indicated, which result from a binary addition of the signal level of the switching signals SA, SB and SC, wherein the switching signal SA with the value 1, the switching signal SB with the value 2, and the switching signal SC with the value 4 are included in the respective value 1 to 6 of the sectors S.

Moreover, in the respective left column of the commutation tables KS and KD, the electrical potentials which the energization device 26 provides on the connection lines LA, LB and LC for the stator coil arrangement 26 are designated by LA, LB and LC. In the commutation tables KS and KD, "+" stands for a respective connection line LA, LB and LC being connected to the supply potential V1, and "−" stands for a respective connection line LA, LB and LC being connected to the potential V0, for example, ground. If the respective connection line LA, LB and LC is not connected to one of the potentials V1 or V0, "0" is indicated in the respective commutation table KS or KD.

Figure 14:
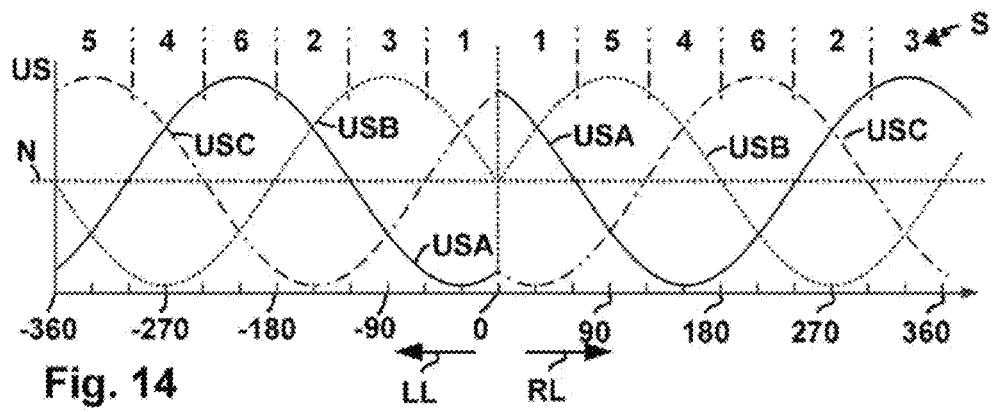
Figure 15:
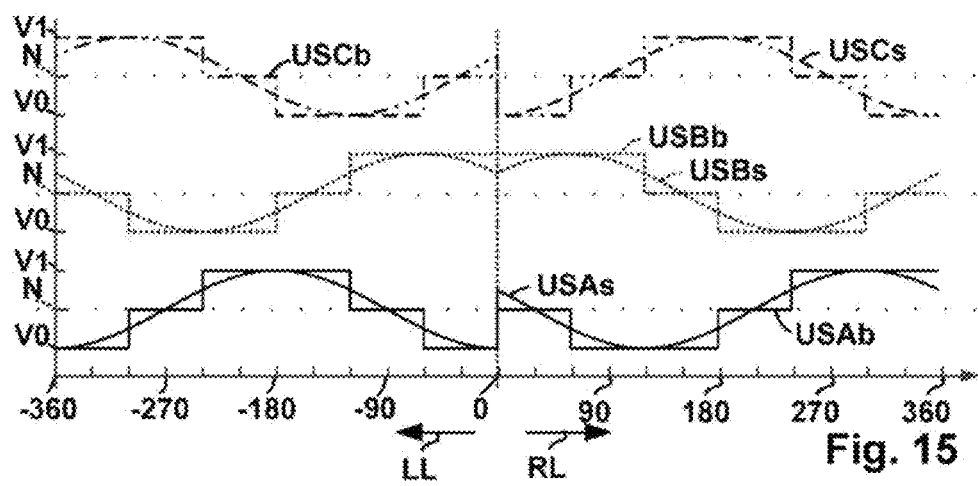

In FIG. 14, the counter-EMF applied to the stator coils 27As, 27Bs and 27Cs connected in a star connection is indicated in the form of voltages USA, USB and USC (EMF=electromotive force) or in English BEMF (=back electromotive force), which are set during a rotation of the rotor 30. Ideally, these voltages USAs, USBs and USCs corresponding to these voltages USA, USB and USC, as represented, for example, in FIG. 15, can be set by the energization device 85. Ideally so to speak sinusoidal voltages USAs, USBs and USCs are set by the energization device 85 and applied on the stator coils 27As, 27Bs and 27Cs. However, the energization device 85 in practice advantageously performs a block energization, and thus sets, for example, the voltages on the stator coils 27As, 27Bs and 27Cs as block voltage curves USAb, USBb and USCb, resulting approximately so to speak in the voltages USAs, USBs and USCs, so to speak. The switching scheme for generating the block phase voltages USAb, USBb and USCb is predetermined by the commutation tables KS. The sectors S with values 1 to 6 are synoptically shown One sees here that, in a star connection, a precommutation occurs.

Figure 16:
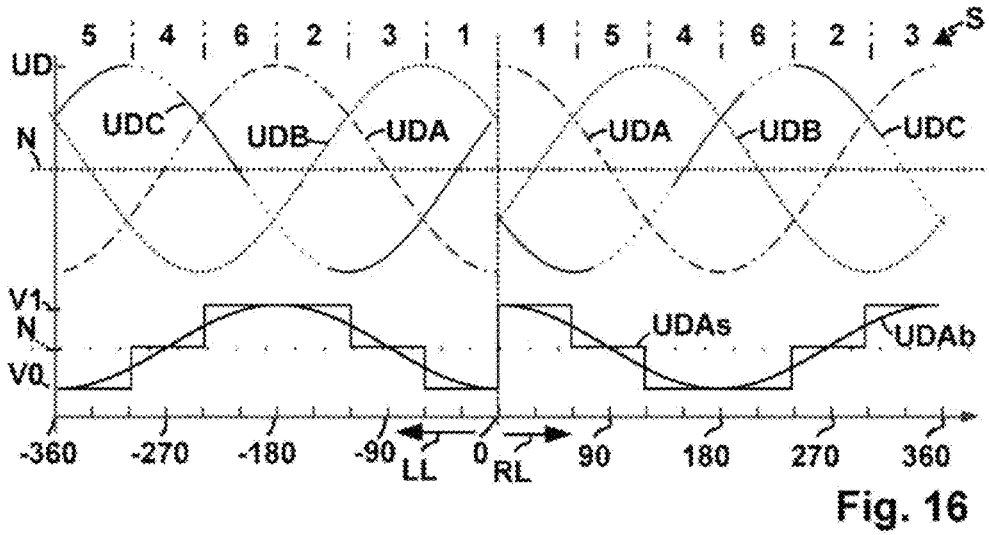

Represented in FIG. 16 are the counter-EMF voltages UDA, UDB and UDC applied on the stator coils 27Ad, 27Bd and 27Cd connected in a delta connection, which are set during the rotation of the rotor 30. Again, these voltages UDA, UDB and UDC in the ideal case so to speak correspond to those voltages which the energization device 85 ideally would set as set voltage curves, that is to say a voltage UDAs of the voltage UDA, set by the energization device 85 on the stator coil 27Ad. However, as already explained in connection with the star connection and FIGS. 14 and 15, the energization device 85, using the commutation table KD, sets block voltages, thus for example, a block voltage UDAb. The additional block delta voltages which the energization device 85 sets on the stator coils 27Bd and 27Cd using the commutation table are not included in FIG. 16 table for reasons of simplification, but the sectors S with the values 1 to 6 are included. It becomes apparent that, in a delta connection, a so to speak ideal or neutral commutation so to speak occurs. At the respective switching times or commutation times, a maximum voltage is applied on the stator coils 27Ad, 27Bd and 27Cd, which leads to a high torque and thus to a high power output of the drive motor ten. In particular, in screwing devices which are intended to operate with a high startup torque even starting from a standstill, an ideal commutation or neutral commutation can therefore be implemented.

The invention claimed is:

1. A drive motor for a vacuum cleaner or a machine tool, in a form of a hand-held machine tool or a semi-stationary machine tool, wherein the drive motor comprises a stator with a stator coil arrangement, and a rotor with a motor shaft which is mounted on the stator or with respect to the stator using a bearing arrangement, so as to be able to rotate about an axis of rotation, wherein the rotor comprises a magnet arrangement with permanent magnets arranged annularly about the axis of rotation, wherein a sensor arrangement is arranged in a stationary manner with respect to the stator in order to detect a respective angle of rotation position of the rotor with respect to the stator, said sensor arrangement comprising at least two sensors which generate switching signals for an energization device for energizing the stator coil arrangement so that the rotor can be driven in rotation about the axis of rotation through energization of the stator coil arrangement and wherein the at least two sensors detect two waves of a magnetic rotating field of the rotor, said waves being phase-shifted about an angle of rotation, wherein the sensors generate the switching signals in a manner dependent on a wave of the two waves of the magnetic rotating field exceeding or undershooting a switching threshold of the sensor, said wave respectively passing through the sensor, and wherein the permanent magnets of the magnet arrangement comprise angular spacings from one another with respect to the axis of rotation, so that the two waves of the magnetic rotating field comprise, at a location of the respective sensor, continuous, half-waves with vertices between continuously rising and falling edges, wherein the waves in transition sections between respectively successive half-waves comprise a different polarity, wherein the waves in the transition sections comprise at least one step or a jump or an unevenness, and wherein the switching thresholds of the sensors are arranged in a region of the continuously rising or falling edges of the half-waves.

2. The drive motor according to claim 1, wherein the permanent magnets of the magnet arrangement are provided and configured for driving in rotation of the rotor in cooperation with the stator coil arrangement.

3. The drive motor according to claim 1 wherein no magnetic encoder provided exclusively for actuating the sensor arrangement and/or permanent magnets of the magnet arrangement provided exclusively for the driving in rotation of the rotor is/are arranged on the rotor as permanent magnetic components or permanent magnets.

4. The drive motor according to claim 1, wherein, between mutually facing sides of adjacent permanent magnets of the magnet arrangement, there are angular spacings, with respect to the axis of rotation.

5. The drive motor according to claim 1, wherein the magnet arrangement protrudes in front of the stator in the direction of the sensor arrangement.

6. The drive motor according to claim 1, wherein, between the magnet arrangement and the sensor arrangement, a spacing of at least 0.4 mm, is provided.

7. The drive motor according to claim 1, wherein the sensor arrangement comprises a sensor support, on which the sensors are arranged.

8. The drive motor according to claim 7, wherein the sensor support is configured to be mounted on a motor cover or between a motor cover and a stator sheet stack of the stator or the motor cover forms the sensor support.

9. The drive motor according to claim 7, wherein the sensor support comprises at least one positive locking contour for mounting on the stator or with respect to the stator, in such a manner that the sensor support with respect to the stator can be mounted in only one angular position with respect to the axis of rotation of the drive motor or only in such angular positions in which, between each sensor of the sensor arrangement and a coil of the stator coils which is arranged next to the sensor, a predetermined angular spacing is provided.

10. The drive motor according to claim 1, wherein at least one sensor or each sensor of the sensor arrangement in each case is arranged centrally between adjacent stator coils or centrally with respect to the stator coil which is associated with the sensor.

11. The drive motor according to claim 1, wherein a full-wave of the magnetic rotating field includes half-waves of different polarity, which each pass through a phase angle of 180°, and wherein the switching thresholds are provided in such a manner that the switching signal of a respective sensor at a phase angle of approximately 30° after a transition of a wave of the magnetic rotating field from a half-wave of one polarity to a half-wave of the other polarity comprises a switching signal change.

12. The drive motor according to claim 1, wherein the phase angle of approximately 30° and/or the switching thresholds are set using a magnetic hysteresis of a respective sensor.

13. The drive motor according to claim 1, wherein the sensor arrangement is arranged with respect to the stator in such a manner that the sensors generate the switching signals in a delta connection of the stator coil arrangement for the purpose of a neutral commutation.

14. The drive motor according to claim 13, wherein the neutral commutation is brought about in that the switching thresholds of the sensors are set up so that the sensors at a phase angle of approximately 30° before and/or after a zero-crossing of a wave of the magnetic rotating field output a switching signal change.

15. The drive motor according to claim 1, wherein the sensor arrangement is arranged with respect to the stator in such a manner that the sensors generate the switching signals in a star connection of the stator coil arrangement for the purpose of a precommutation.

16. The drive motor according to claim 15, wherein the precommutation is electrically exact or corresponds to approximately 30°.

17. The drive motor according to claim 1, wherein the energization device comprises a commutation table for the stator coil arrangement in a delta connection and/or a commutation table for the stator coil arrangement in a star connection or alternatively can be parametrized with commutation tables for a delta connection and a star connection.

18. The drive motor according to claim 1, wherein the magnetic rotating field acting on the sensors contains a magnetic subfield which is generated by the stator coil arrangement and contains a magnetic subfield which is generated by the permanent magnets, wherein the subfields overlap one another.

19. A machine tool with a drive motor according to claim 1 or an energization device for the energization of the drive motor.

20. The machine tool according to claim 19, wherein the stator coil arrangement of the drive motor is connected in a delta connection to the energization device, and the machine tool comprises a supply connection for connecting an electric DC voltage energy storage, or wherein the stator coil arrangement of the drive motor is connected in a star connection to the energization device, and the machine tool comprises a supply connection for an electric AC voltage network.

* * * * *